Feb. 19, 1957 — H. H. HOFFMAN — 2,781,532
PROCESS AND APPARATUS FOR LACING LEATHER
Filed Feb. 6, 1952 — 6 Sheets-Sheet 1
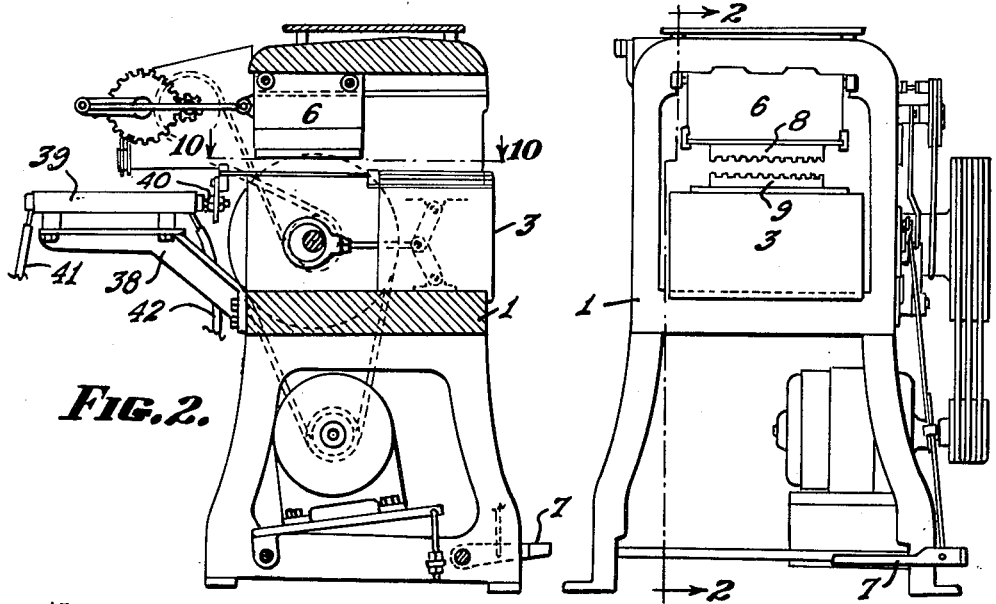
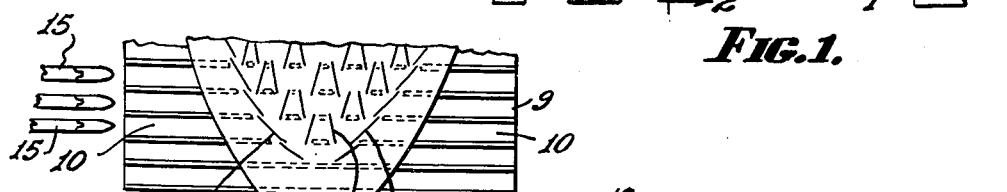
INVENTOR.
HOWARD H. HOFFMAN,
BY Allen & Allen
ATTORNEYS.

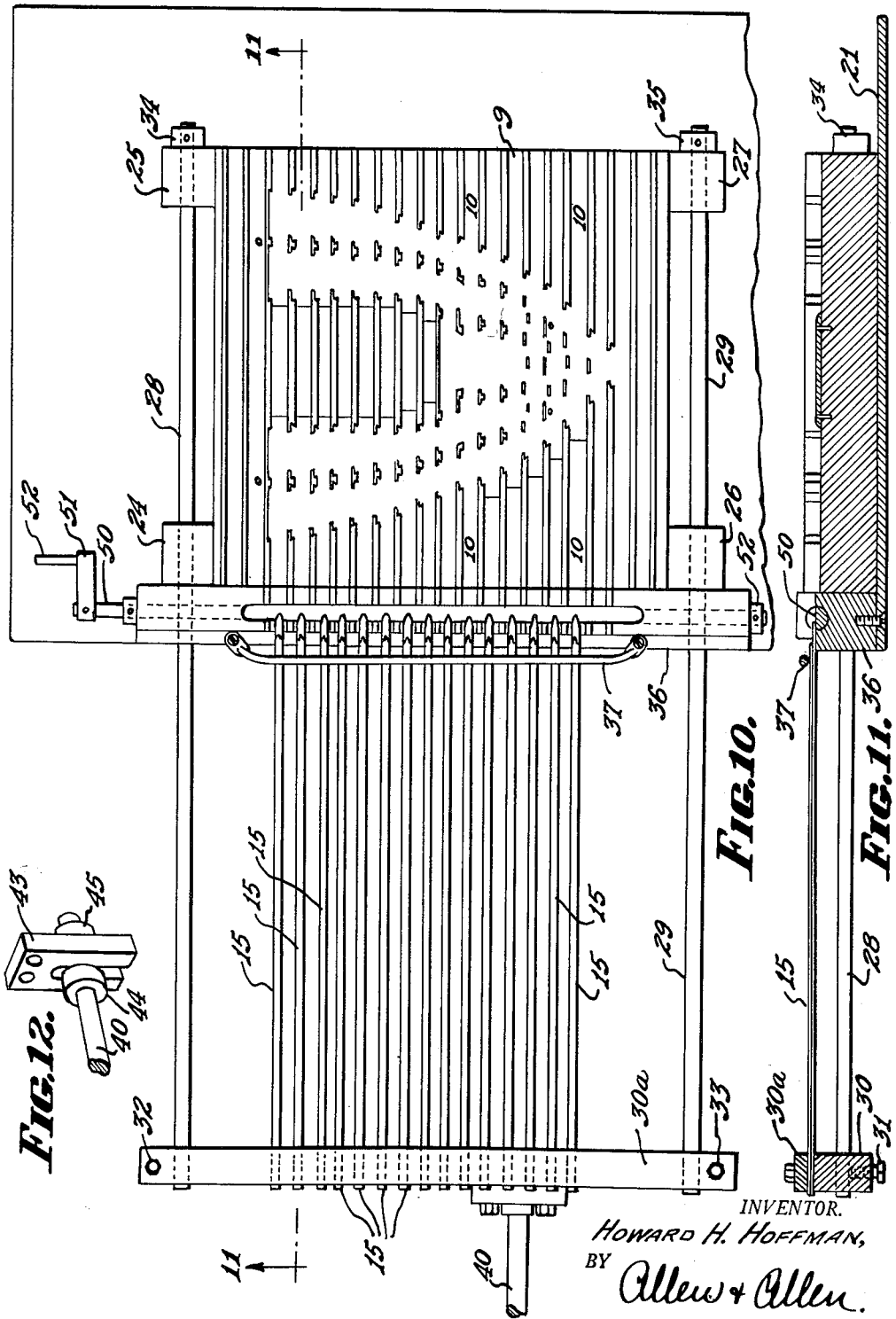

Feb. 19, 1957     H. H. HOFFMAN     2,781,532
PROCESS AND APPARATUS FOR LACING LEATHER
Filed Feb. 6, 1952     6 Sheets-Sheet 3
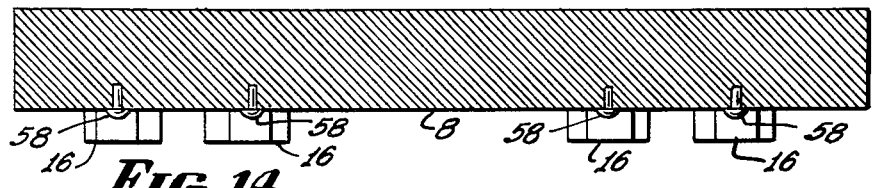
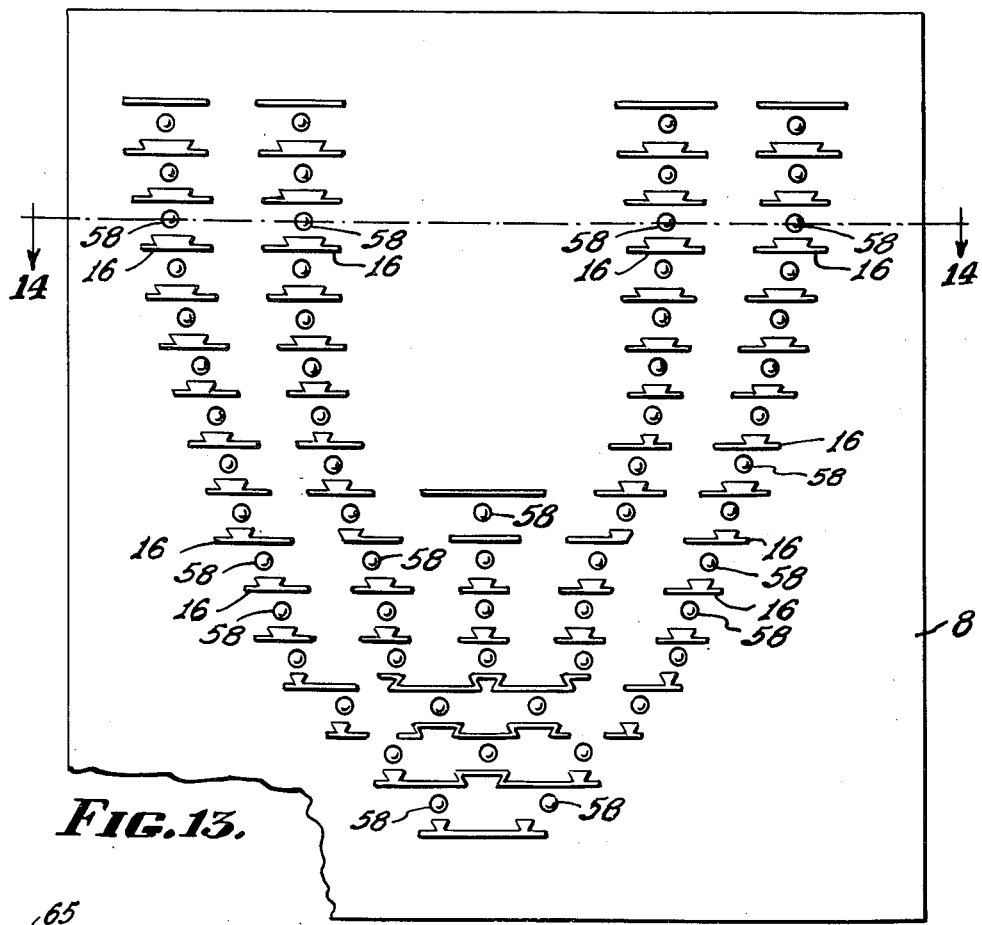
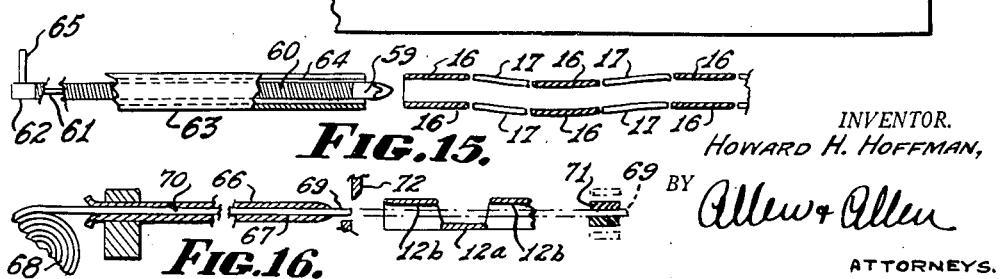
INVENTOR.
HOWARD H. HOFFMAN,
BY
ATTORNEYS.

Feb. 19, 1957
H. H. HOFFMAN
2,781,532
PROCESS AND APPARATUS FOR LACING LEATHER
Filed Feb. 6, 1952
6 Sheets-Sheet 4
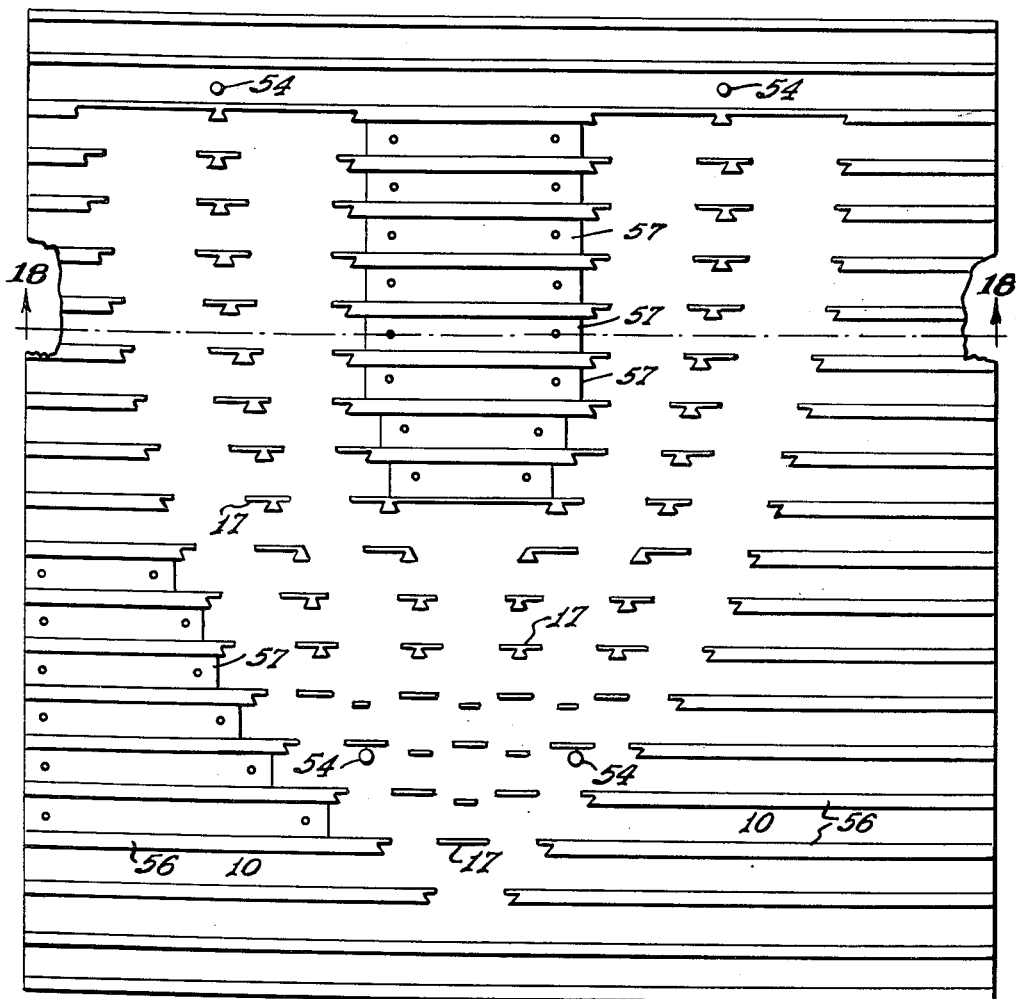
FIG. 17.
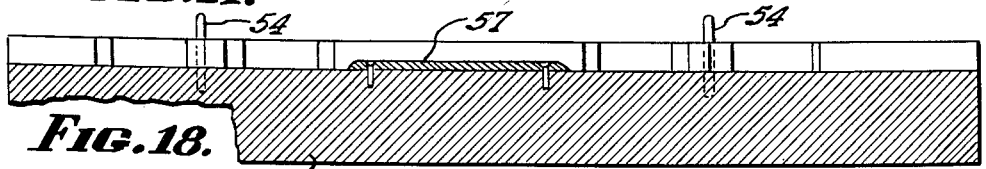
FIG. 18.
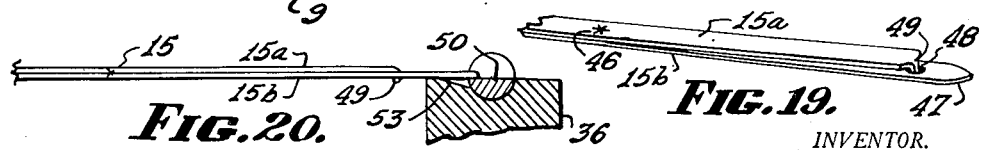
FIG. 20.     FIG. 19.
FIG. 21.
INVENTOR.
HOWARD H. HOFFMAN,
BY Allen & Allen
ATTORNEYS.

Feb. 19, 1957    H. H. HOFFMAN    2,781,532
PROCESS AND APPARATUS FOR LACING LEATHER
Filed Feb. 6, 1952    6 Sheets-Sheet 5
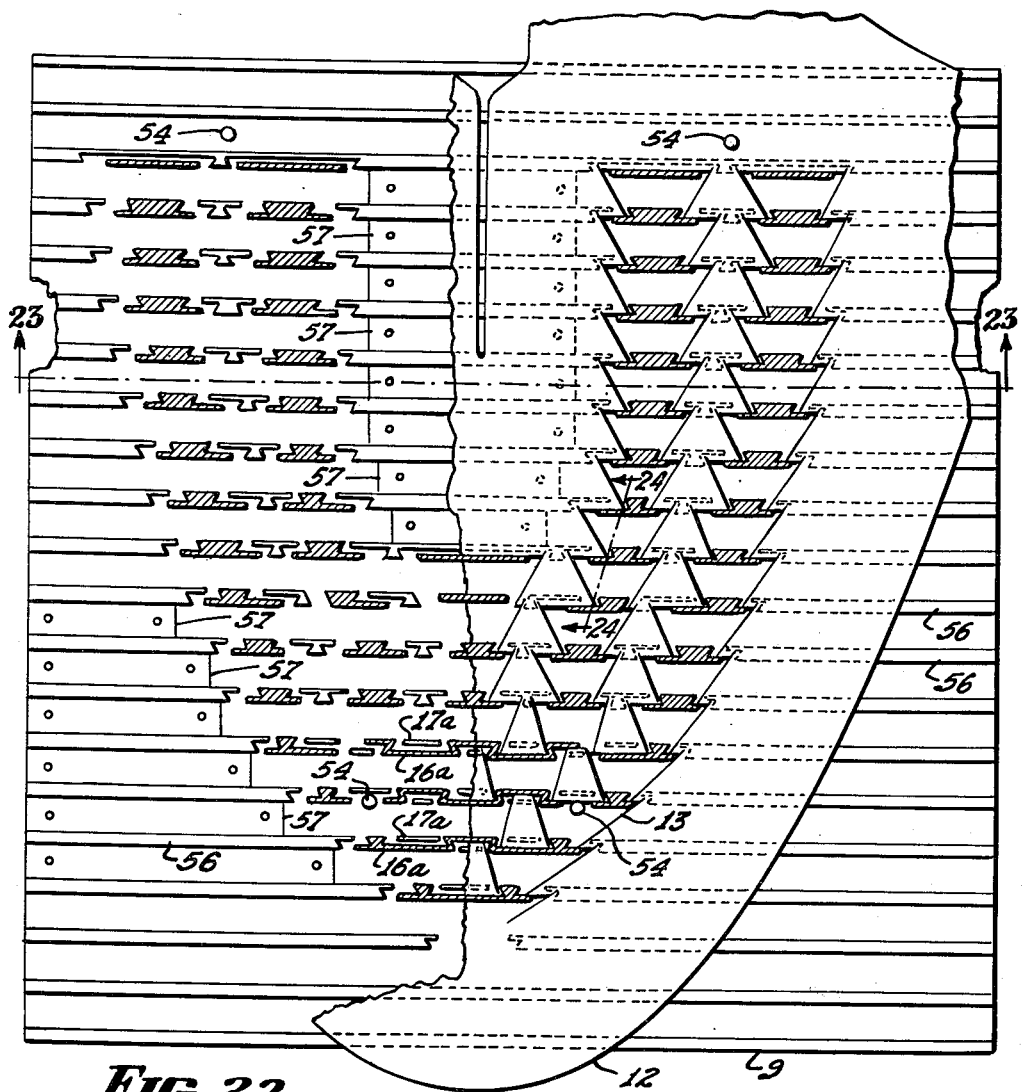
FIG. 22.
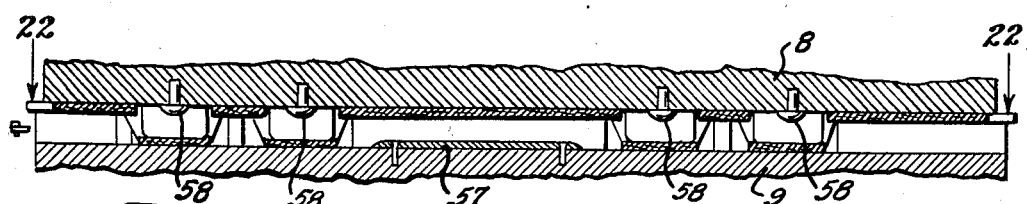
FIG. 23.
FIG. 24.
INVENTOR.
HOWARD H. HOFFMAN,
BY Allen & Allen
ATTORNEYS.

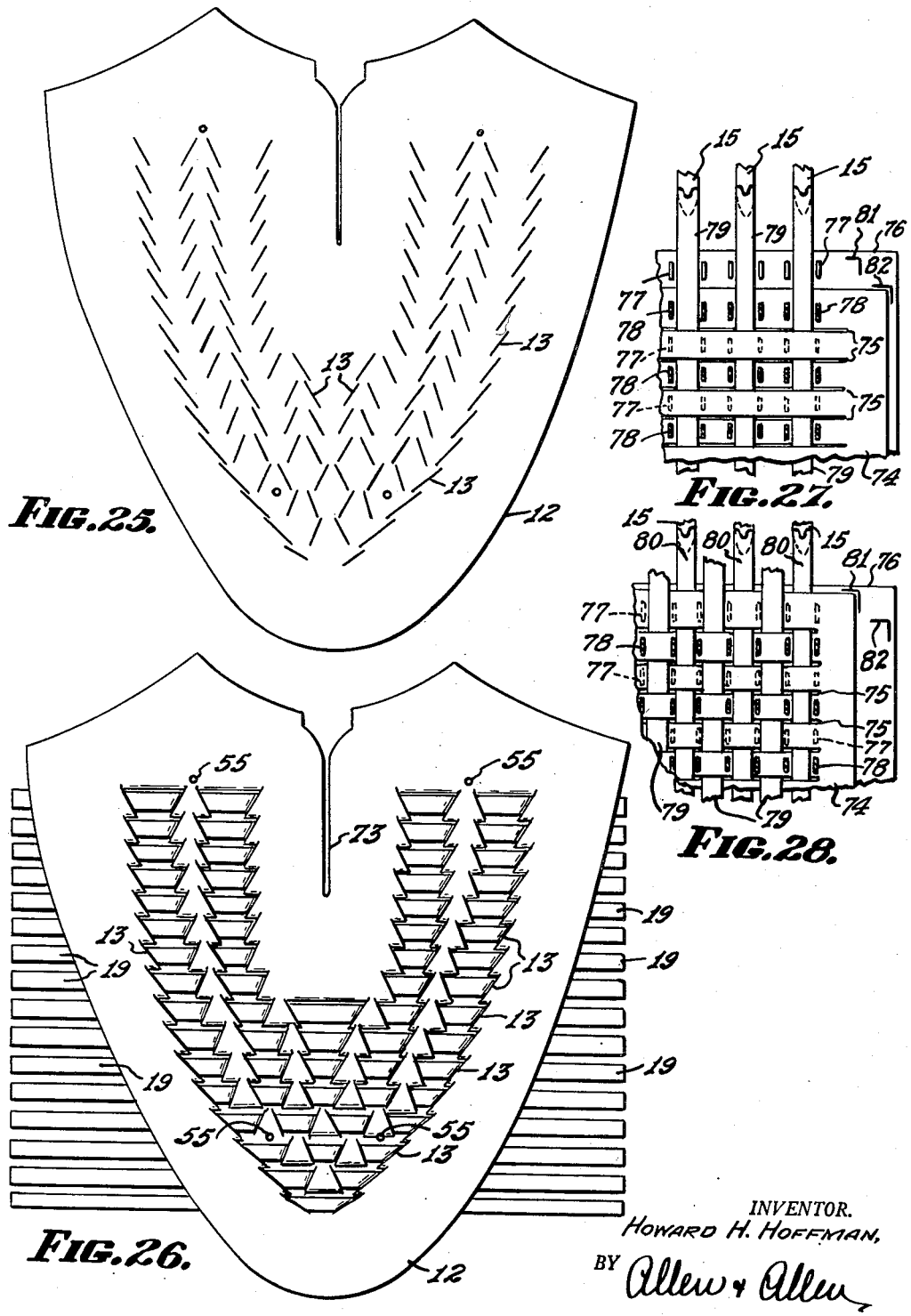

United States Patent Office 2,781,532
Patented Feb. 19, 1957

---

2,781,532

PROCESS AND APPARATUS FOR LACING LEATHER

Howard H. Hoffman, Newport, Ky., assignor to The Louis G. Freeman Company, Cincinnati, Ohio, a corporation of Ohio Application February 6, 1952, Serial No. 270,241

17 Claims. (Cl. 12—51)

This application pertains to the lacing of leather or other webs. The teachings herein find especial utility in the manufacture of laced shoes; and the invention will be described in connection with the manufacture of such articles, although the invention may be used for other purposes.

Shoes in which the uppers are formed from laced leather or the like have proved popular because of their softness, flexibility and ventilated character. In a laced shoe, the upper leather is not in the form of a continuous, imperforate membrane, as is well known; and while comparable coolness and ventilation might be attained by merely perforating the leather, the same softness and appearance value is not present. Laced shoes have presented a serious problem in this country due to the high cost of hand operations, especially as compared with the low cost of such operations abroad, so that while an active demand induces the inclusion of domestic laced leather shoes in a sales line, they must frequently be sold at a price which is not comparable with their cost of manufacture.

It may be stated that laced leather structures which could be cut apart into upper pieces for shoes can be produced continuously by operations analogous to weaving; but while this has been attempted, it has not proved of significant value. The reason for this is that the edge portions of upper pieces cut from such structures are made up solely of the ends of leather strips or thongs. These are difficult to attach to shoe sole structures in a truly positive way. As a consequence, a laced shoe upper should be made from a piece of leather having a continuous margin adapted for sewing, tacking or cementing, which piece is slitted as may be required and then laced with separate strips or thongs, the ends of which may be attached to the continuous margin, but are not relied upon to hold the upper structure to the sole of the shoe.

In the hand fabrication of such a laced upper structure, an elongated needle element is fastened to a support or table, the slitted leather is then threaded onto the needle, the needle passing through all slits through which a single strip or thong is to be laced. Then the strip is engaged with holding means at the free end of the needle, and the upper piece is withdrawn, thus causing the strip to be pulled through the series of slits. This sequence of operations must be repeated for each strip required by the composite upper. It will be seen that the operation is inconvenient, time-consuming and costly. Moreover, an operator anxious to turn out work at as rapid a rate as possible will frequently thread the upper piece onto the needle incorrectly without noticing that she has done so, thus improperly lacing one or more strips, which must then be removed and the structure relaced.

A fundamental object of this invention is the provision of means and a method for the positive, accurate and economical lacing of leather or other webs.

An object of the invention is the provision of means and a method for the production of composite laced structures in a single operation, as distinct from a strip-by-strip operation.

An object of the invention is the provision of a method employing a minimum of mechanism beyond that normally to be found in a shoe manufacturing plant, and employing certain machine elements which are usual equipment.

An object of the invention is the provision of means and a method by which laced shoes may be made at costs comparable to the cost of non-laced shoes; and a means and method which are flexible and adaptable to the manufacture of a wide variety of types and styles of laced shoes.

These and other objects of the invention, which will be set forth or explained hereinafter or will be apparent to one skilled in the art upon reading these specifications, I accomplish by that procedure and mechanism of which I shall now describe certain exemplary embodiments, reference being made to the drawings forming part of these specifications. In these drawings:

Figure 1, which is semi-diagrammatic, is a front elevation of one type of machine in connection with which my invention may be practiced.

Figure 2 is a sectional view thereof taken along the line 2—2 of Figure 1.

Figure 3 is a diagrammatic representation of an assembly comprising upper and lower die members, a piece of upper leather, and a needle.

Figure 4 is a partial plan view of a lower die element with a piece of upper leather thereon, showing also the relationship of needles thereto, and is related to Figure 3 in accordance with the section line 4—4 of that figure.

Figure 5 is a partial sectional view, diagrammatic in nature, of die and leather elements in assembly, and is related to Figure 3 in accordance with the section line 5—5 of that figure.

Figure 6 is a view similar to Figure 3 showing the dies in closed position.

Figure 7 is a similar view showing the needle in a lacing position.

Figure 8 is a similar view, diagrammatically illustrative of the final step in a lacing operation.

Figure 9 is a partial plan view of an exemplary form of laced leather upper.

Figure 10 is a plan view of a lower die element, a needle assembly, and a portion of the means used to actuate the needle assembly.

Figure 11 is a sectional view related to Figure 10 in accordance with the section line 11—11.

Figure 12 is a partial perspective view of an arrangement for coupling the needle assembly to an actuating rod.

Figure 13 is a plan view of an upper die element of exemplary character.

Figure 14 is a sectional view thereof, taken along the section line 14—14 of Figure 13.

Figure 15 is a horizontal sectional view of a portion of a die assembly and needle structure showing the use of a flexible needle.

Figure 16 is a partial sectional view of an assembly showing a mode of lacing rendered possible through the use of continuous lengths of lacing material.

Figure 17 is a plan view of a lower die assembly on a scale similar to that of Figure 13.

Figure 18 is a sectional view thereof taken along the section line 18—18 of Figure 17.

Figure 19 is a perspective view of the end of a needle of exemplary character.

Figures 20 and 21 are partial sectional views showing means for opening up the end portion of a needle and releasing a lacing strip therefrom.

Figure 22 is a composite showing involving a plan view of the lower die element, a partial plan view of a slitted upper leather piece, and coacting elements of an upper die, the last named elements being shown in section, the section being related to the line 22—22 of Figure 23.

Figure 23 is a sectional view of the assembly taken along the line 23—23 of Figure 22.

Figure 24 is a partial sectional view on an enlarged scale of a leather piece and coacting die elements.

Figure 25 is a plan view of an exemplary upper leather piece in slitted condition.

Figure 26 is a similar plan view of the same upper leather piece after the operation of lacing.

Figures 27 and 28 are diagrammatic partial views with certain elements sectioned, illustrative of a mode of producing a basket-weave type of laced structure.

Briefly, in the practice of my invention, I have found it possible to subject a piece of upper leather, for example a vamp, to deflecting members acting from both sides of it, and in this way to deflect portions of the leather to either side of a median plane in such fashion that a member passed along the median plane will have some portions of the leather lying to one side of it and some portions lying to the other. If the member is in the nature of a needle, it may be used to draw or position a leather strip or thong with respect to the vamp in the same way the needle is or was positioned, thus lacing the vamp.

Pairs of deflecting members may be operated serially if desired, thus deflecting the leather in different portions at different times; but it is readily possible to deflect all desired portions of the leather simultaneously. The lacing may be done thong-by-thong or in groups of thongs; but when the leather piece is deflected simultaneously for the lacing of a group of strips or thongs, it is most convenient to employ a group assembly of needles, mechanically actuated by common actuating means, and thus lace a plurality of strips or thongs at one time. Indeed, in types of laced structures in which the lacing strips do not lie edge-to-edge but are slightly separated, it is possible and preferable to perform all of the lacing in a single operation, as hereinafter described.

Where the lacing strips are to lie in edge-to-edge or in overlapping relationship in the laced structure, it will be found preferable to do the lacing in a plurality of stages (generally two), a plurality of thongs, however, being laced in each stage. Thus every other thong may be laced in one operation, and the remainder in another operation, with or without a different deflecting operation between the lacing operations.

The leather to be laced is preferably slit before being deflected, but this is not necessarily so, since it is possible to deflect unslit leather and then perforate or slit it by the use of thrust knives or sharpened needles pushed through it along the median plane.

The deflecting means are so shaped and disposed that they form guides for the passage of the needles in directions in the median plane and transverse the needles. Where the deflecting means act simultaneously, they are preferably fastened to or made part of common supports on either side of the leather, instead of being separate and separately operated. Hereinafter, in such a case, I refer to the combination of a plurality of deflecting elements and a common support as a "die," using this term in a broad sense. The "dies" for deflecting the leather, of course, form a pair. The individual dies may be entirely separate, or they may be hinged together, or otherwise guided one on the other for relative movement. The relative movement may be accomplished in various ways as by screw or toggle means. Preferably, the dies are separate and are operated for relative movement by the platens of some suitable mechanical or hydraulic press capable of exerting the required pressure.

Preferably also, in the practice of my invention, the dies have means for guiding the needles and preventing misalignment thereof in directions transverse the median plane, as hereinafter set forth.

There are in current use in shoe manufacturing plants machines employed to treat precut upper leather pieces for the formation of perforations therein for decorative or other purposes. Machines of this general type have also been employed to form slits in upper leather pieces where the upper leather pieces are to be laced with leather strips or thongs. In general, such machines comprise a press of some sort with a lower die member having means for the positioning and holding of the upper leather piece thereon, and an upper member against which the die member operates, conveniently called an "anvil member." There are various forms of such machines, an exemplary form being shown in Figures 1 and 2. This is the form generally described in U. S. Letters Patent No. 2,526,868. The machine consists of a housing element 1, which is part of a suitable machine frame. Mounted in the housing is a lower platen member 3 which has a vertical reciprocatory motion, such as may be produced by a linkage driven by an eccentric, as shown. There is an upper platen member 6, mounted for horizontal reciprocatory motion in the housing, such as may be produced by a crank and pitman drive, as shown. The machine is motorized, and a cycling mechanism, controlled by a foot treadle 7, results in a prearranged series of movements of the platens which may be described as follows. The upper platen 6 moves forward to a position in which it is vertically opposite the lower platen 3. Thereupon the lower platen moves upwardly so that material between the platens may be treated by the die and anvil combination. The machine may be stopped in this position. After the operation is concluded, the lower platen descends, and the upper platen moves rearwardly to the position shown in Figure 2, thus disclosing the die on the lower platen for the removal and replacement of material to be treated.

The details of the machine do not require special description since they do not per se affect or limit the present invention, and are unnecessary in view of the reference above to a patent in which such a machine is fully described. Such a machine, among others, is suitable for the practice of the present invention when upper and lower die members, 8 and 9 in Figure 1, are affixed to the respective platens, and when certain other appurtenances, hereinafter to be described, are added to the machine.

In the practice of my process, pieces of leather or other web material are precut to the form of pieces suitable for the uppers of shoes, as is conventional in the art. For lacing purposes, certain slits are preferably formed in the upper pieces, as may be accomplished on a machine of the type hereinabove described and provided with a suitable slitting die, or accomplished otherwise as may be desired. It will be understood that there are various types and styles of lacing and laced shoes, and the illustrative use hereinafter of an upper leather piece slit in a certain fashion is not to be taken as a limitation of the invention to the particular style shown. In general, the upper leather piece is slitted or cut, usually with a plurality of slits which are aligned crosswise of the upper leather piece in rectilinear or curved rows, so that a needle may be passed through one group of slots for the lacing of a particular strip or thong, through another group of slots for the lacing of another strip or thong, and so on for as many strips or thongs as may be required to complete the lacing of the piece. The slots, however, may be of various shapes and sizes, may be spaced in various ways and at varying distances, and may be slanted at various angles to the axis of the upper leather piece or parallel or perpendicular with the axis, as may be required for a given style of lacing. Furthermore, it will be understood that the term "slits" as used herein is employed in the broad sense. In many forms of laced shoes the upper members are merely provided with linear cuts which form the slits; but I use the term broadly enough to encompass two-dimensional perforations, slots, holes, or any other apertures through which strips or thongs are to be drawn in lacing the structure.

In lacing an upper piece it will be understood that there is a group of aligned slits for each lacing strip and that the lacing strip will be caused to pass through these slits so as, in its final position, to lie under and over portions of the upper leather piece lying between the slits. To accomplish this in accordance with the exemplary embodiment of my invention, the contoured and slitted upper leather piece is positioned and held on a lower die member and is treated by having an upper die brought against it. The dies in their coaction serve to depress or deflect portions of the leather lying between the slits in such fashion that the leather portions, beneath which a lacing strip is to be positioned, are brought into substantially a single plane, while the leather portions above which the strip is to be positioned are brought into substantially a single plane so spaced from the first mentioned plane that a lacing means or needle may be thrust between the dies and between the deflected leather portions. One or both of the dies are so configured as to provide guide channels for the needles (a plurality of needles being preferably simultaneously employed as hereinafter explained); and the deflecting portions of the dies are so configured as to form in effect continuations of the guide channels for the needles. The thrusting of the needles through the structure either serves to position the lacing strips or lacing strips are attached to the projecting ends of the needles and are drawn through the slits of the upper leather piece upon withdrawal of the needles.

Figure 4 is a purely diagrammatic representation of a lower die element 9 having channels 10. A precut piece of upper leather 12 is shown as resting on the die. This leather piece will previously have been provided with slits of suitable form and position, such as the slits 13. A series of needles is diagrammatically indicated at 15. In Figure 3 the upper die 8 is shown as having a series of downwardly projecting deflecting elements 16 while the lower die 9 is shown as having upward projections 17. By comparing Figures 3 and 5, it will be seen that, for the particular type of laced structure of this exemplary embodiment, the projections 16 and 17 are broad in one direction and narrow in the opposite direction; and it will be understood further that the projections on the two dies are so located and configured as to pass each other. As will be clear from Figure 6, the action of the projections 16 on the upper die is to depress certain portions 12a of the upper leather piece, these portions lying between slits therein, downwardly toward the lower die 9 while the action of the projections 17 is to hold up intervening portions 12b of the upper leather piece. In the particular embodiment, each part of the leather lying between slits is deflected by a pair of members 16 or 17, the members of each pair being separated from each other so as to provide continuations of the channels 10 aforesaid. Figure 7 shows how, if the needle 15 is thrust through the channel, it will lie above the leather portions 12a, but below the leather portions 12b. The needle has at its end an engagement means diagrammatically indicated at 15a. If now a leather strip 19 is engaged with the needle and the needle withdrawn to its original position, as in Figure 8, the leather strip 19 will replace the needle and now will lie above the leather portions 12a and below the leather portions 12b. Any excess length of the lacing strip may be cut off, as by a knife or shear 20. In this way a structure may be made, partially diagrammatically illustrated in Figure 9, where the upper leather piece 12 is shown as laced with the strips or thongs 19, 19a, etc., which strips pass through the slits 13 and lie above and below respective portions of the upper leather piece.

In Figure 25 I have more fully illustrated the upper leather piece 12 provided with the slits 13 for the exemplary style of laced leather structure; and in Figure 26 I have shown this structure fully laced with the strips 19, 19a etc. It will be seen that a large number of strips are employed in the lacing of this upper leather piece (16 in the particular embodiment), and while this may be varied widely for different types of laced structures, it is readily possible in the exemplary and similar structures to lace all of the lacing strips in a single operation, thereby saving time and making for economy. This is accomplished by the use of a plurality or gang of lacing needles simultaneously operated; and before more completely describing the configuration of the dies for use in my apparatus, I shall first outline a suitable means for the operation of the needle gang. Referring to Figures 10 and 11, I have shown the lower die 9, which may have a piece 21 suitable for attachment to the lower platen 3 of the press. The die is preferably provided with ears 24, 25, 26 and 27 in which a pair of rods 28 and 29 are slidably mounted. At their rear ends these rods are attached to a bar 30 in which they may be held by set screws, as at 31 (Figure 11). An upper bar element 30a may be attached by bolts 32 and 33 to the lower bar in such a way as to form a clamp for holding the needles 15. One or both of the bars 30 or 30a may be grooved to accept the rear ends of the needles 15 and to hold them in alignment with the channels 10 of the lower die 9. It will be seen that if the clamp means 30, 30a are moved forwardly, the needles will be thrust through the channels 10 of the lower die 9. During this movement the rods 28 and 29 slide in the ears aforesaid, and stop elements 34 and 35 may be affixed to the forward ends of the rods to limit the rearward motion of the clamp means in such a way that when the needles are fully withdrawn, the forward ends thereof lie above the die 9 or a member 36 affixed to the rear thereof. In order further to guide the needles, I may provide a rod-like guide 37 attached to the member 36.

The moving portion of the assembly thus far described is preferably driven by power means, and while various of such means may be employed, a fluid pressure cylinder, such as an air cylinder, is convenient to use. In Figure 2, I have shown a bracket 38 attached to the rear of the press machine. An air cylinder 39 is mounted on this bracket. It is provided with a piston, not shown, having a piston rod 40 projecting from one end of the cylinder through a suitable packing or gland. The cylinder is provided with pressure connections 41 and 42 at either end. Through these, fluid pressure may be admitted to the cylinder at either side of the piston to determine forward and rearward movement thereof. It will be understood that the connections 41 and 42 are coupled through suitable valve mechanism with a source of fluid under pressure. The valve mechanism may be hand operated and located in a position of convenient access to the operator of the machine, or if desired, it may be coupled to moving parts of the press for automatic actuation.

As detailed in Figure 12, a forked or perforated element 43 is bolted or otherwise attached to the bar 30. It accepts the piston rod 40 which is held against longitudinal movement with respect to the element 43 by collars or the like 44 and 45.

A type of needle which I prefer to use is shown in Figure 19. It is made up of two spring metal strips 15a and 15b fastened together throughout most of their conjoint length by brazing or welding, as at 46. The lower strip 15b projects forwardly and may be pointed or rounded, as at 47. It also is preferably provided with a depression or perforation 48. The upper strip 15a is provided with a downwardly extending detent 49. A piece of lacing leather may be engaged with such a needle by separating the free ends of the needle portions 15a and 15b and placing the end of a leather strip therebetween, whereupon it will be held by the coaction of the detent 49 and the depression 48. The end of the leather strip may be perforated if desired, but this is not usually necessary. It will be understood from what has been said above that when all of the needles are thrust through the channels 10 of the lower die so that the ends thereof project beyond the die, lacing strips may be attached to the ends of all of the needles and a withdrawal of the needles from the die will result in a lacing of all of the strips through the upper leather piece as aforesaid. It then becomes necessary to disengage the leather strips from the ends of the withdrawn needles. When the ends of the needles are located at the rear of the die and out of a position of convenient access to the operator, I prefer to provide a mechanical means for opening up the needles. One such means is illustrated in Figures 10, 11, 20 and 21. The member 36 is cut away in its central portion so as to have a surface lying substantially at the level of the bottoms of the channels 10 of the die member 9, but is thick enough at its ends to provide journal bearings for a rotary rod element 50 held in place by collars 51 and 52. The rod element is cut away in its central portion so as to be half round, as illustrated in Figures 11, 20 and 21, and when the rod is in the position shown in the first two of these figures, its upper surface corresponds in height with the level of the bottoms of the channels 10. When, however, the rod is rotated, which can be done by means of the crank and handle 51, 52, or by power means, it assumes the position shown in Figure 21, an edge of the rod engaging and depressing the projecting end of the needle member 15b, the upper surface of the member 36 being cut away as at 53 to permit this action. Thus, any leather strip previously engaged by the detents 49 will be released, and the laced leather structure can be removed from the die 9 after the opening of the press.

Coming now to a consideration of the structure of the dies themselves, it will be understood that this structure will vary in accordance with the nature of the upper leather pieces, the manner in which they are slit, the style of the lacing, and the like. A means must be provided for locating the preslit upper leather piece accurately in position on the die and holding it there. This may be done in various ways, but one convenient way of accomplishing it is by providing the lower die with upstanding pins 54 in suitably spaced positions (see Figures 17 and 18) and the upper leather piece with corresponding perforations 55 (see Figure 26). The upper leather piece may then be located on the die accurately and held in position by the pins. The upper die may be recessed as required for the acceptance of the pins. The accurate location of the perforations 55 in the upper leather piece may be accomplished by forming them with suitable die elements at the time the upper leather piece is die-slit.

It will be clear from Figure 22 that the upper leather piece does not occupy all of the space of the die element. The lower die element, excepting where deflection of the leather is to take place, is provided with ridge or land elements 56 defining the grooves 10 in which the needles slide. Elsewhere on the die there are the elements 17 which serve to hold or deflect leather portions upwardly. These elements are never wider than the lands 56 and are so positioned that they are aligned with the lands and spaced from each other so as to provide, as it were, prolongations of the grooves. The elements 17 may be elongated in the direction of the lands 56 as shown, their dimensions in these directions being appropriate to the widths of the leather portions which must be held up by them. Within the framework of the above description, the elements 17 may have various shapes and various parts for performing particular functions. The upper die is illustrated at 8 in Figure 13, and has the downwardly projecting elements 16. It does not require the lands 56; but again, the downward projections 16 for deflecting the leather must be located in alignment with the lands of the lower die when the dies are closed and must not be substantially thicker than the lands so as to leave space for the passage of the needles in the said prolongations of the channels 10. Again, the deflecting elements 16 may have odd shapes depending on the portions of the leather which they must deflect.

The die projections 16 and 17 may in part or in whole be thinner than the transverse dimension of the lands so that in various portions of the dies a projection from the upper die and a projection from the lower die may lie in side-by-side relationship, in alignment with an individual land, and spaced from each other, forming nevertheless a composite which is not substantially thicker than the land itself. Such relationships are illustrated in Figure 22 which is a plan view of the lower die with the projections of the upper die shown in cross-hatched section, a portion of the upper leather piece being shown in place. It will be seen, for example, that a lower die projection 17a at various places lies opposite an upper die projection 16a with a space therebetween, both being in alignment with a land 56. The reason for such a construction is that portions of the leather in a slitted upper leather piece, such as that shown in Figure 25, must frequently be depressed or deflected in such manner that portions of the leather are disposed substantially vertically. This is illustrated in Figure 24 where an upwardly deflected leather portion 12b is shown as connected to a downwardly deflected portion 12a by a substantially vertical portion 12c which is in part at least confined between a lower die extension 17 and an upper die extension 16. Thus the needles are guided laterally by the projections or deflecting elements themselves and are prevented from catching on the leather.

In order that the leather of the upper piece can be formed into such configurations, the leather normally stretches to some extent. Where the lacing strips are to lie close together as in most laced structures, the leather must be so configured and confined in order to clear the channels 10 for the passage of the needles 15. A stretching of the leather in the way indicated produces a slight effect of embossing which contributes to the ultimate neatness and beauty of the laced structure. Ordinarily, when leather is embossed between dies, the leather is preconditioned, as by being dampened or wet, and the dies are heated. Neither of these expedients is ordinarily necessary or advisable in the practice of my invention; but it does not vitiate the spirit of the invention to condition the leather before treatment if desired and even to practice concurrent embossing where embossing means forming part of the dies do not interfere with the practice of my process as described. Needless to say, my invention may be practiced upon uppper leather pieces which have previously been embossed as well as slit.

The various leather portions, i. e. the portions 12a which are deflected downwardly and the portions 12b which are deflected or held upwardly, must be separated far enough to permit the passage of the needle and the subsequent passage of the lacing strip. Preferably, the dies are so shaped and configured that the portions 12a and 12b can be deflected and held against the surfaces of the respective dies; but it is advisable to provide upper and lower guide or deflecting means for the needles so that these will not catch on the edges of the deflected leather portions. This is conveniently done in my apparatus by the provision on the lower die of elements such as the plate 57 which has the width of a groove, the approximate thickness of the leather of the upper leather piece and is tapered or beveled at its ends as shown. The length of such plates may be apportioned to the die spaces in which they are located. The upper die (as also most clearly shown in Figure 23) is provided with guide elements. These may take the form of the heads 58 of rivet-like bodies set into the upper die, the heads being of approximately the thickness of the upper leather piece and rounded as indicated. In other types of laced structures, the guide elements could have other shapes inclusive of the plate-like shapes of elements 57. It is also possible to provide the upper die with rounded spring pressed plungers as guide means, if desired.

Thus it will be seen that in the preferred form of my invention the needles are guided on all four sides by the combined action of the deflecting elements or die projections 16 and 17 (laterally in the median plane) and the guide elements 57 and 58 (in directions transverse the median plane) in such fashion as to pass the deflected leather portions without interference. The guide elements 57 and 58 should have a thickness greater than the thickness of the deflected leather. Putting this another way, the guide elements should project inwardly or toward the needles beyond the expected position of the inner surfaces of the deflected leather. It is not always necessary to provide a guide means 57 or 58 against every die surface in the channel which is not covered with deflected leather. But the needles, being elongated and relatively thin elements frequently tend for various causes (such as a set in the needles themselves, or slight misalignment of guide or operating means) to depart from the true median plane. Hence the importance of providing guide means 58 or 57 or both at such intervals as may be required for the proper operation of the needles.

In much lacing work, the lacing strips passing under and over portions of the upper leather piece lie in straight lines transverse or parallel to the major axis of the upper leather piece. However, for special designs and effects, it is sometimes desirable to have the lacing leather strips follow curved or non-rectilinear paths. In the practice of my invention, this may be accomplished by arranging the lands 56 and the upper and lower die projections 16 and 17 to define the desired non-rectilinear paths and then employing needles which are flexible, and hence capable of following the non-rectilinear paths during advancement and withdrawal. Various constructions are possible. I have shown one of them diagrammatically in Figure 15 where lower die projections 17 and upper die projections 16 are arranged to provide a non-rectilinear path when the dies are closed. The needles has a head portion 59 constructed substantially as described in connection with Figure 19; but the body of the needle is formed in a flexible fashion from a spring-like winding of wire, as indicated at 60. Inside the winding 60 there is a flexible strand 61 permanently connecting the head piece 59 and a tail piece 62. The purpose of this construction is to prevent elongation of the needle as it is withdrawn. Because the needle is flexible, means will have to be provided to keep that portion of the needle which is not confined in a channel 10 from buckling as the needle is thrust forward. This may be accomplished by confining the needles beyond the die 9 in tubular guides 63 which are slotted as at 64, the needle tail piece having an operating projection 65 which will ride through the slot 64 and which may be attached in any suitable fashion to the bar assembly 30, 30a. Needless to say, the bar assembly will be so configured as to pass the tubular guide 63. Other variants of construction for the same purpose will suggest themselves to skilled workers in the art.

I have hereinabove described the operation of my method and apparatus in an embodiment in which the upper leather piece is configured by the dies, the needles are thrust through between the dies, leather strips are attached to the needles, and the needles are withdrawn thereby positioning the strips and lacing the structure. This mode of operation is advantageous where the lacing material is in the form of individual leather strips. If a continuous supply of lacing material is available, a different procedure may be followed. As illustrated in Figure 16, a hollow needle 66 may be employed with lacing material 67 from a supply 68 of indefinite length, threaded through it, projecting from its forward end as at 69 and held against reverse movement by an interior detent 70 or by other means. When such a needle assembly is thrust through the closed dies between the upwardly deflected leather portions 12b and the downwardly deflected leather portions 12a, the lacing material will be carried with it. The forwardly extending ends 69 of the lacing material may then be clamped as at 71, and the needles withdrawn. The lacing material feeds through the hollow needles during their withdrawal and may then be cut off by the knife or shear 72, completing the lacing.

A supply of lacing leather of continuous or indefinite length involves difficulty; but it will be understood that my invention is not confined to the use of leather materials. Plastic lacing strips may be employed and these are available in continuous or indefinite lengths.

While I have hereinafter used the term "upper leather piece" I desire it to be understood in the specifications and in the claims which follow employing the same term, that my apparatus may be used upon and my process practiced with flexible materials other than leather. In other words, my invention is not in any sense limited to specific compositions of the webs which may be employed either as the slitted structures to be laced or the materials for lacing them. Further, while I have herein described and illustrated an upper leather piece designed for the formation of the front portion of a shoe, the principles of my invention are applicable to the lacing of structures for other shoe portions such as side and rear parts formed of leather or other materials. The term "upper" as used in connection with leather or other pieces herein is to be understood merely as indicating flexible parts designed for the formation of shoe uppers. Finally, it will be evident that the principles of my invention may be employed for the lacing of leather or other webs for the formation of articles other than shoes, including but without limitation a wide variety of leather goods, purses, handbags, etc.

When a laced structure has been formed as illustrated in Figure 26, it will be usual to attach the lacing strips or thongs to the unslit marginal portions of the body piece including the separation divsion indicated at 73. This may be done by cementing, stitching, or in other ways; and the lacing strips will usually then be trimmed to be coterminous with the marginal portions of the body piece, or at least so as not to extend therebeyond.

While I have thus far described my operation in connection with the lacing of upper leather pieces wherein individual slits are provided for each passage of each lacing strip through the body piece (there being a wide variety of styles and designs in this type), the principles of my invention may be applied to other lacing procedures, and in particular, to styles in which the body piece is provided with elongated slits serving concurrently for the passage of a plurality of lacing strips. Thus my procedure and apparatus are adapted for the formation of what may be termed a "tight basket weave" in a laced structure. Referring to Figures 27 and 28, I have there illustrated a body piece 74 provided with elongated slits 75. This piece may be located on a lower die 76 having upward projections 77 and treated by an upper die having downward projections 78 in such a way as to depress and raise alternate strip-like portions of the body piece, whereupon every other transverse lacing strip 79 is inserted by the needles 15. If now the dies are opened and the body piece 74 moved on the lower die 76 in two directions by the width of a strip in each, the dies may be again closed and the remaining alternate strips 80 laced by means of the needles 15, as shown in Figure 28. This provides a complete, tight basket weave. To illustrate the alternative positions of the body piece 74 in the two figures, I have shown angular corner positioning elements 81 and 82. Such elements may be used as locating means if desired. But it is also possible, and in many instances preferable, to employ pins on the dies engaging perforations in the body piece, as hereinabove described.

Modifications may be made in my invention without departing from the spirit of it. Having thus described my invention in certain exemplary embodiments, what I claim as new and desire to secure by Letters Patent is:

1. A process of producing a laced structure which comprises acting upon a flexible web to deflect aligned portions of the web alternately to either side of a median plane, passing along said median plane a lacing element so that alternately deflected portions of said web lie to either side of said lacing element, engaging a strip of lacing material with an end of said lacing element, and thereafter withdrawing said lacing element so as to position said lacing strip between the alternately deflected portions of said web.

2. A process of producing a laced structure which comprises slitting a body piece, confining the body piece between die structures configured to deflect portions of the body piece to either side in transversely spaced relation, simultaneously passing between said dies a plurality of needle elements so that each such element has a portion of said body piece lying on each side thereof and employing said needle elements to position strips of lacing material in a similar fashion with respect to said body piece, including the step of simultaneously withdrawing the needle elements from between said dies.

3. The process claimed in claim 2, wherein said plurality of needle elements is thrust between said dies, wherein strips of lacing material are engaged with the ends of said needle elements, and said needle elements withdrawn from between said dies, thus positioning said lacing strips therebetween.

4. The process claimed in claim 2, wherein said needle elements are hollow and contain said strips of lacing material, and wherein said strips of lacing material are held so as to be withdrawn from said needle elements while said needle elements are being withdrawn from between said dies.

5. The process claimed in claim 2, wherein said needle elements are hollow and contain said strips of lacing material, and wherein said strips of lacing material are held so as to be withdrawn from said needle elements while said needle elements are being withdrawn from between said dies, and severing said strips beyond the ends of said needle elements.

6. The process claimed in claim 2, wherein said die elements act to displace said portions of the body piece toward the respective dies with substantially perpendicular interconnecting portions of said body piece, in which said deflecting elements are aligned so as to provide guides for the passage of said needle elements, and in which said deflecting elements are aligned so as to produce nonrectilinear channels for the passage of said needles, said needles being flexible so as to follow said channels.

7. A process of forming laced structures which comprises providing a body piece with elongated slits dividing it in substantial part into elongated strips extending in one direction, treating said body piece between dies each having aligned deflecting portions arranged to deflect parts of said body sheet oppositely and bring them into spaced relation, inserting a plurality of spaced lacing strips between the said dies and deflected portions of said body piece, releasing said dies, shifting the position of said body piece with respect thereto and again closing said dies so as to deflect intermediate portions of said body piece and bring them into spaced relation, and thereupon inserting additional strips of lacing material between the first mentioned strips of lacing material and releasing the dies, whereby to form a basket-weave-type laced structure.

8. In combination, deflecting elements for deflecting aligned portions of a body web piece alternately to opposite sides of a median plane, said deflecting elements being aligned in one direction and spaced in a transverse direction to provide a channel therebetween with respect to which said alternate portions of the body web piece are oppositely deflected, a needle element for passage through said channel, and mechanical means for thrusting said needle element between said dies.

9. The structure claimed in claim 8 in which said needle is guided by said deflecting elements, and including additional guide means for said needle acting in a direction transverse said median plane.

10. In combination, deflecting elements for deflecting aligned portions of a body web piece alternately to opposite sides of a median plane, said deflecting elements being spaced in one direction and aligned in a transverse direction to provide channels for the passage of needle elements between the alternately deflected portions of said body piece, and a needle assembly comprising a plurality of needle elements mounted with respect to a common support and aligned for passage through said channels.

11. In combination, a pair of dies having deflecting elements for portions of a slitted body web piece to be placed therebetween, said deflecting elements being aligned in one direction of said dies and spaced in a transverse direction to provide channels for the passage of needle elements between the deflected portions of said body piece, and a needle assembly comprising a plurality of needle elements mounted with respect to a common support and aligned for the passage through said channels.

12. In combination, a pair of dies having deflecting elements for portions of a slitted body web piece to be placed therebetween, said deflecting elements being aligned in one direction of said dies and spaced in a transverse direction to provide channels for the passage of needle elements between the deflected portions of said body piece, and a needle assembly comprising a plurality of needle elements mounted with respect to a common support and aligned for the passage through said channels, means for operating said dies and means for moving said needle assembly so as to thrust said needle elements between said dies when said dies are in closed position, and to withdraw said needle elements.

13. A pair of dies for the purpose described comprising a lower die and an upper die each having deflecting elements thereon, said deflecting elements being aligned in one transverse direction of said dies and spaced in another direction so as to form between them passageways for needles, one at least of said dies having additional elements acting as lands defining channels for the passage of needles, said lands being in alignment with said deflecting elements, the deflecting elements of the same die being located at each side of each such passageway, certain of the deflecting elements of each die being aligned with the said lands, being substantially thinner than the said lands, and located adjacently with a space therebetween within which a portion of material being treated by said die can be confined.

14. A process of producing a laced structure which comprises acting upon a flexible web by deflecting members from both sides so as to deflect aligned portions of the web alternately to either side of a median plane, and passing along said median plane a lacing element, so that said alternately deflected portions lie to either side of said lacing element, said lacing element in its passage being guided by said deflecting members and using said lacing element to position a lacing between said alternately deflected portions, and thereupon alternately deflecting, by means of deflecting members acting from both sides, other portions of said flexible web to either side of a median plane and positioning another lacing element between said last mentioned deflected portions.

15. In combination, deflecting elements for deflecting aligned portions of a body web piece alternately to opposite sides of a median plane, said deflecting elements being aligned in one direction and spaced in a transverse direction to provide a channel therebetween with respect to which said alternate portions of the body web piece are oppositely deflected, a needle element for passage through said channel, said needle element having a bifurcated end adapted to engage and retain an end of a lacing strip between the bifurcations, one of said bifurcations being longer than the other, and means for engaging and deflecting said longer bifurcation whereby to release said lacing strip.

16. In combination, a support, deflecting means on said support for deflecting portions of a web placed thereon, said deflecting means aligned in one direction and spaced in a transverse direction to provide a channel therebetween for the passage of a needle element, a needle element with a bifurcated end arranged for passage through said channel, and means on said support for spreading the bifurcations of said needle, said means comprising an element journaled with respect to said support, having one position in which it lies wholly out of the path of said needle and another position in which it engages and deflects a bifurcation thereof.

17. In combination, a pair of dies having deflecting elements for portions of a slitted body web piece to be placed therebetween, said deflecting elements being aligned in one direction of said dies and spaced in a transverse direction to provide channels for the passage of needle elements between the deflected portions of said body piece, and a needle assembly comprising a plurality of needle elements mounted with respect to a common support and aligned for the passage through said channels, said needle elements having bifurcated forward ends, one of the bifurcations of each needle being longer than the other, a shaft journaled in one of said dies, said shaft being flattened for the passage of said needle elements when said shaft is in one position, said shaft being rotatable to another position in which a portion thereof engages and depresses the longer of the bifurcations of each of said needle elements.

References Cited in the file of this patent

UNITED STATES PATENTS 2,157,791    Klima _____ May 9, 1939